(12) United States Patent
Wu et al.

(10) Patent No.: US 11,578,966 B2
(45) Date of Patent: Feb. 14, 2023

(54) PORTABLE TEST PAPER COUNTING DEVICE AND METHOD BASED ON SINGLE PHOTON DETECTOR

(71) Applicant: Shanxi University, Taiyuan (CN)

(72) Inventors: Jizhou Wu, Taiyuan (CN); Jie Ma, Taiyuan (CN); Suya Song, Taiyuan (CN); Liantuan Xiao, Taiyuan (CN); Suotang Jia, Taiyuan (CN)

(73) Assignee: Shanxi University, Taiyuan (CN)

( * ) Notice: Subject to any disclaimer, the term of this patent is extended or adjusted under 35 U.S.C. 154(b) by 50 days.

(21) Appl. No.: 17/465,428

(22) Filed: Sep. 2, 2021

(65) Prior Publication Data
US 2022/0074735 A1  Mar. 10, 2022

(30) Foreign Application Priority Data
Sep. 5, 2020 (CN) .......................... 202010924599.3

(51) Int. Cl.
*G01B 11/06* (2006.01)
(52) U.S. Cl.
CPC .................. *G01B 11/06* (2013.01)
(58) Field of Classification Search
CPC ...................................................... G01B 11/06
USPC ......................................................... 356/632
See application file for complete search history.

(56) References Cited

U.S. PATENT DOCUMENTS 4,990,967 A * 2/1991 Colglazier ............. G03G 15/50
399/85

* cited by examiner

Primary Examiner — Tarifur R Chowdhury
Assistant Examiner — Omar H Nixon
(74) Attorney, Agent, or Firm — Renner, Otto, Boisselle & Sklar, LLP

(57) ABSTRACT

The present disclosure relates to a test paper counting technology, in particular to a portable test paper counting device and method based on a single photon detector. A portable test paper counting device based on a single photon detector is provided, which includes a box-shaped housing, two guide rail pairs, two hanger rods, a laser, a reflecting mirror, a single photon detector, a power supply, and a PC computer. A rectangular operating hole penetrating from left to right is formed in a lower edge of a right side wall of the box-shaped housing. A right part of a bottom wall of the box-shaped housing is provided with an assembly hole penetrating from up to down. A left side wall of the box-shaped housing is provided with a threading hole penetrating from left to right. Sliders of the two guide rail pairs both face downwards.

8 Claims, 1 Drawing Sheet

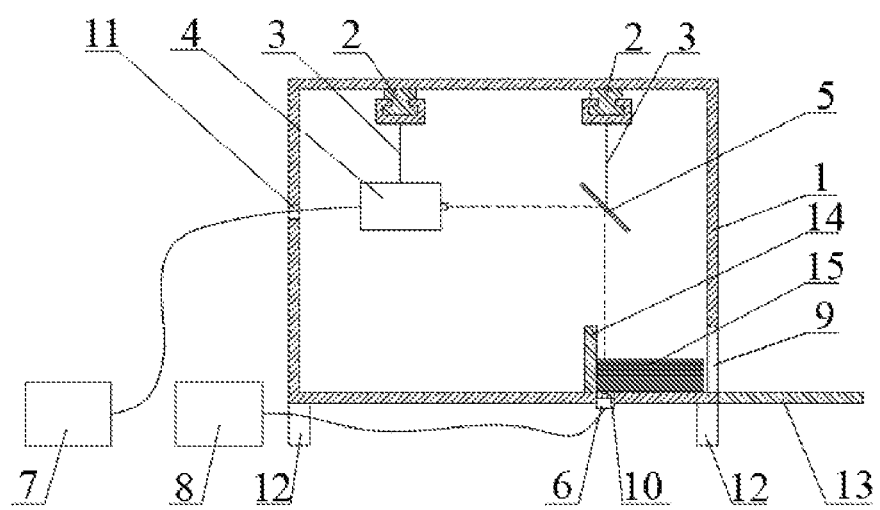

PORTABLE TEST PAPER COUNTING DEVICE AND METHOD BASED ON SINGLE PHOTON DETECTOR

This patent application claims the benefit and priority of Chinese Patent Application No. 202010924599.3, filed on Sep. 5, 2020, the disclosure of which is incorporated by reference herein in its entirety as part of the present application.

TECHNICAL FIELD

The present disclosure relates to a test paper counting technology, in particular to a portable test paper counting device and method based on a single photon detector.

BACKGROUND ART

In recent years, along with unceasing progress of society, more and more talents are needed, and accordingly there are more and more examinations. In an examination process, test paper counting is a necessary part. At present, the test paper counting is usually carried out manually. Practice has proven that manually counting the test papers is not only time-consuming and laborious, but also low in accuracy rate. In view of this, it is necessary to invent a portable test paper counting device and method based on a single photon detector to solve the problems that manually counting the test papers is not only time-consuming and laborious, but also low in accuracy rate.

SUMMARY

The present disclosure provides a portable test paper counting device and method based on a single photon detector to solve the problems that manually counting test papers is not only time-consuming and laborious, but also low in accuracy rate.

The present disclosure is implemented by adopting the following technical solutions:

A portable test paper counting device based on a single photon detector is provided, which includes a box-shaped housing, two guide rail pairs, two hanger rods, a laser, a reflecting mirror, a single photon detector, a power supply, and a PC computer. A rectangular operating hole penetrating from left to right is formed in a lower edge of a right side wall of the box-shaped housing, and a lower hole wall of the rectangular operating hole is jointed to an inner bottom wall of the box-shaped housing. A right part of the inner bottom wall of the box-shaped housing is provided with an assembly hole penetrating from up to down. A left side wall of the box-shaped housing is provided with a threading hole penetrating from left to right. A guide rail of the first guide rail pair is longitudinally fixed to a left part of an inner top wall of the box-shaped housing. A guide rail of the second guide rail pair is longitudinally fixed to a right part of the inner top wall of the box-shaped housing. Sliders of the first guide rail pairs and the second guide rail pairs both face downwards. A first hanger rod is vertically fixed to a lower surface of the slider of the first rail pair. A second hanger rod is vertically fixed to a lower surface of a slider of the second rail pair. The laser is fixed to a lower end of the first hanger rod, and an emitting end of the laser faces rightwards. The reflecting mirror is fixed to a lower end of the second hanger rod, and a mirror surface of the reflecting mirror is inclined leftwards. An incident end of the reflecting mirror directly faces the emitting end of the laser. The single photon detector is fixedly embedded in the assembly hole, and the single photon detector is lower than the inner bottom wall of the box-shaped housing. An incident end of the single photon detector faces upwards and directly faces an emitting end of the reflecting mirror. The power supply is located outside the box-shaped housing, and an output end of the power supply passes through the threading hole and is connected to a power supply end of the laser. The PC computer is located outside the box-shaped housing, and an input end of the PC computer is connected to an output end of the single photon detector.

In some embodiments, four supporting legs may be further included. The four supporting legs may be vertically fixed at four corners of an outer bottom wall of the box-shaped housing in one-to-one correspondence.

In some embodiments, a rectangular holding plate may be further included. The rectangular holding plate may be horizontally fixed to a lower edge of a right outer side wall of the box-shaped housing, and an upper surface of the rectangular holding plate may be jointed to the lower hole wall of the rectangular operating hole.

In some embodiments, a limit baffle may be further included. The limit baffle may be vertically fixed to the right part of the inner bottom wall of the box-shaped housing along a longitudinal direction, and a right surface of the limit baffle may be jointed to a left hole wall of the assembly hole.

In some embodiments, the box-shaped housing may be a transparent housing.

In some embodiments, with consideration of the portability of the device and user requirements, the power source may be lithium ion cells and batteries.

A test paper counting method based on a single photon detector (this method is implemented based on the portable test paper counting device based on a single photon detector of the present disclosure) is implemented by adopting the following steps:

putting step, configured for putting a stack of test papers to be counted horizontally into the box-shaped housing through the rectangular operating hole, such that a left edge of the stack of test papers is located between the incident end of and the emitting end of the single photon detector;

starting step, configured for starting the laser, where a beam emitted by the laser is incident upon the left edge of the stack of test papers via the reflecting mirror, partial photons in the beam is absorbed by the stack of test papers, the remaining photons pass through the stack of test papers and are incident upon the single photon detector, and the single photon detector detects a number N of the remaining photons, and sends a detection result to the PC computer;

calculating step, configured for calculating, by the PC computer, an luminous intensity I of the beam after passing through the stack of test papers according to the number N of the remaining photons first, then calculating a thickness d of the stack of test papers according to the luminous intensity I of the beam after passing through the stack of test papers, and then calculating a number m of the test papers according to the thickness d of the stack of test papers, thereby completing the counting of the stack of test papers, where specific calculation formula expressions are as follows:

$$I = Nh\nu \qquad (1)$$

$$I = I_0 e^{-\alpha_a(\lambda)d} \qquad (2)$$

$$m = d/d_0 \qquad (3)$$

wherein: h denotes a Planck constant; $\nu$ denotes an output frequency of the laser; $I_0$ denotes an output luminous intensity of the laser; $\alpha_a(\lambda)$ denotes an absorption coefficient of a single test paper; $d_0$ denotes a thickness of a single test paper; and h, v, $I_0$, $\alpha_a(\lambda)$, and $d_0$ are all known parameters.

In some embodiments, in step 3, v and $I_0$ may be both preset known parameters; and $\alpha_a(\lambda)$ and $d_0$ may be both pre-determined known parameters.

Compared with manually counting the test papers, the portable test paper counting device and method based on a single photon detector of the present disclosure realizes quick, convenient and accurate test paper counting through using the light absorption properties of paper, thereby not only saving both time and labor in the counting process, but also greatly improving the counting accuracy.

The present disclosure is reasonable in structure and ingenious in design, effectively solves the problems that manually counting the test papers is time-consuming and laborious, and low in accuracy rate, and is suitable for schools, examination institutions and the like.

BRIEF DESCRIPTION OF THE DRAWINGS

FIG. 1 is a schematic structural diagram according to the present disclosure.

List of the reference characters: 1 box-shaped housing; 2 rail pair; 3 hanger rod; 4 laser; 5 reflecting mirror; 6 single photon detector; 7 power supply; 8 PC computer; 9 rectangular operating hole; 10 assembly hole; 11 threading hole; 12 supporting leg; 13 rectangular holding plate; 14 limit baffle; and 15 test paper. In the drawings, the dotted line represents a beam.

DETAILED DESCRIPTION OF THE EMBODIMENTS

A portable test paper counting device based on a single photon detector is provided, which includes a box-shaped housing 1, two guide rail pairs 2, two hanger rods 3, a laser 4, a reflecting mirror 5, a single photon detector 6, a power supply 7, and a PC computer 8. A rectangular operating hole 9 penetrating from left to right is formed in a lower edge of a right side wall of the box-shaped housing 1, and a lower hole wall of the rectangular operating hole 9 is jointed to an inner bottom wall of the box-shaped housing 1. A right part of the inner bottom wall of the box-shaped housing 1 is provided with an assembly hole 10 penetrating from up to down. A left side wall of the box-shaped housing 1 is provided with a threading hole 11 penetrating from left to right. A guide rail of the first guide rail pair 2 is longitudinally fixed to a left part of an inner top wall of the box-shaped housing 1. A guide rail of the second guide rail pair 2 is longitudinally fixed to a right part of the inner top wall of the box-shaped housing 1. Sliders of the two guide rail pairs 2 both face downwards. A first hanger rod 3 is vertically fixed to a lower surface of the slider of the first rail pair 2; a second hanger rod 3 is vertically fixed to a lower surface of a slider of the second rail pair 2. The laser 4 is fixed to a lower end of the first hanger rod 3, and an emitting end of the laser 4 faces rightwards. The reflecting mirror 5 is fixed to a lower end of the second hanger rod 3, and a mirror surface of the reflecting mirror 5 is inclined leftwards. An incident end of the reflecting mirror 5 directly faces the emitting end of the laser 4. The single photon detector 6 is fixedly embedded in the assembly hole 10, and the single photon detector 6 is lower than the inner bottom wall of the box-shaped housing 1. An incident end of the single photon detector 6 faces upwards and directly faces an emitting end of the reflecting mirror 5. The power supply 7 is located outside the box-shaped housing 1, and an output end of 7 of the power supply passes through the threading hole 11 and is connected to a power supply end of the laser 4. The PC computer 8 is located outside the box-shaped housing 1, and an input end of the PC computer 8 is connected to an output end of the single photon detector 6.

The device further includes four supporting legs 12, which are vertically fixed at four corners of an outer bottom wall of the box-shaped housing 1 in one-to-one correspondence.

The device further includes a rectangular holding plate 13. The rectangular holding plate 13 is horizontally fixed to a lower edge of a right outer side wall of the box-shaped housing 1, and an upper surface of the rectangular holding plate 13 is jointed to the lower hole wall of the rectangular operating hole 9.

The device further includes a limit baffle 14. The limit baffle 14 is vertically fixed to the right part of the inner bottom wall of the box-shaped housing 1 along a longitudinal direction, and a right surface of the limit baffle 14 is jointed to a left hole wall of the assembly hole 10.

The box-shaped housing 1 is a transparent housing.

The power source 7 is lithium ion cells and batteries.

A test paper counting method based on a single photon detector, which is implemented by the portable test paper counting device based on a single photon detector of the present disclosure, is implemented by adopting the following steps.

In step 1, a stack of test papers 15 to be counted is put horizontally into the box-shaped housing 1 through the rectangular operating hole 9, and ensure that left edge of the stack of test papers 15 is located between the incident end of the single photon detector 6 and the emitting end of the reflecting mirror 5.

In step 2, the laser 4 is started, where a beam emitted by the laser 4 is incident upon the left edge of the stack of test papers 15 via the reflecting mirror 5, partial photons in the beam is absorbed by the stack of test papers 15, the remaining photons pass through the stack of test papers 15 and are incident upon the single photon detector 6, and the single photon detector 6 detects a number N of the remaining photons, and sends a detection result to the PC computer 8.

In step 3, a luminous intensity I of the beam after passing through the stack of test papers 15 is calculated by the PC computer 8 according to the number N of the remaining photons first, then a thickness d of the stack of test papers 15 is calculated according to the luminous intensity I of the beam after passing through the stack of test papers 15, and then a number m of the test papers 15 is calculated according to the thickness d of the stack of test papers 15, thereby completing the counting of the stack of test papers 15, where specific calculation expressions are as follows:

$$I = Nhv \quad (1)$$

$$I = I_0 e^{-\alpha_a(\lambda)d} \quad (2)$$

$$m = d/d_0 \quad (3)$$

where h denotes a Planck constant; v denotes an output frequency of the laser 4; $I_0$ denotes an output luminous intensity of the laser 4; $\alpha_a(\lambda)$ denotes an absorption coefficient of a single test paper 15; $d_0$ denotes a thickness of a single test paper 15; and h, v, $I_0$, $\alpha_a(\lambda)$, and $d_0$ are all known parameters.

In step 3, v and $I_0$ are both preset known parameters; and $\alpha_a(\lambda)$ and $d_0$ are both pre-determined known parameters.

Although specific embodiments of the present disclosure are described above, those skilled in the art should understand that these are only examples, and the protection scope of the present disclosure is defined by the appended claims. Those skilled in the art can make various changes or modifications to these embodiments without departing from the principle and essence of the present disclosure, but these changes and modifications all fall within the protection scope of the present disclosure.

What is claimed is:

1. A portable test paper counting device based on a single photon detector, comprising a box-shaped housing, two guide rail pairs, two hanger rods, a laser, a reflecting mirror, a single photon detector, a power supply, and a PC computer, wherein a rectangular operating hole penetrating from left to right is formed in a lower edge of a right side wall of the box-shaped housing, and a lower hole wall of the rectangular operating hole is jointed to an inner bottom wall of the box-shaped housing; a right part of the inner bottom wall of the box-shaped housing is provided with an assembly hole penetrating from up to down; a left side wall of the box-shaped housing is provided with a threading hole penetrating from left to right; a guide rail of the first guide rail pair is longitudinally fixed to a left part of an inner top wall of the box-shaped housing; a guide rail of the second guide rail pair is longitudinally fixed to a right part of the inner top wall of the box-shaped housing; sliders of the first guide rail pairs and the second guide rail pairs both face downwards; a first hanger rod is vertically fixed to a lower surface of a slider of the first rail pair; a second hanger rod is vertically fixed to a lower surface of a slider of the second rail pair; the laser is fixed to a lower end of the first hanger rod, and an emitting end of the laser faces rightwards; the reflecting mirror is fixed to a lower end of the second hanger rod, and a mirror surface of the reflecting mirror is inclined leftwards; an incident end of the reflecting mirror directly faces the emitting end of the laser; the single photon detector is fixedly embedded in the assembly hole, and the single photon detector is lower than the inner bottom wall of the box-shaped housing; an incident end of the single photon detector faces upwards and directly faces an emitting end of the reflecting mirror; the power supply is located outside the box-shaped housing, and an output end of the power supply passes through the threading hole and is connected to a power supply end of the laser; and the PC computer is located outside the box-shaped housing, and an input end of the PC computer is connected to an output end of the single photon detector.

2. The portable test paper counting device based on a single photon detector according to claim 1, further comprising four supporting legs, wherein the four supporting legs are vertically fixed at four corners of an outer bottom wall of the box-shaped housing in one-to-one correspondence.

3. The portable test paper counting device based on a single photon detector according to claim 1, further comprising a rectangular holding plate, wherein the rectangular holding plate is horizontally fixed to a lower edge of a right outer side wall of the box-shaped housing, and an upper surface of the rectangular holding plate is jointed to the lower hole wall of the rectangular operating hole.

4. The portable test paper counting device based on a single photon detector according to claim 1, further comprising a limit baffle, wherein the limit baffle is vertically fixed to the right part of the inner bottom wall of the box-shaped housing along a longitudinal direction, and a right surface of the limit baffle is jointed to a left hole wall of the assembly hole.

5. The portable test paper counting device based on a single photon detector according to claim 1, wherein the box-shaped housing is a transparent housing.

6. The portable test paper counting device based on a single photon detector according to claim 1, wherein the power source is lithium ion cells and batteries.

7. A test paper counting method based on a single photon detector by using a portable test paper counting device based on a single photon detector, the portable test paper counting device based on a single photon detector comprising a box-shaped housing, two guide rail pairs, two hanger rods, a laser, a reflecting mirror, a single photon detector, a power supply, and a PC computer, wherein a rectangular operating hole penetrating from left to right is formed in a lower edge of a right side wall of the box-shaped housing, and a lower hole wall of the rectangular operating hole is jointed to an inner bottom wall of the box-shaped housing; a right part of the inner bottom wall of the box-shaped housing is provided with an assembly hole penetrating from up to down; a left side wall of the box-shaped housing is provided with a threading hole penetrating from left to right; a guide rail of the first guide rail pair is longitudinally fixed to a left part of an inner top wall of the box-shaped housing; a guide rail of the second guide rail pair is longitudinally fixed to a right part of the inner top wall of the box-shaped housing; sliders of the first guide rail pairs and the second guide rail pairs both face downwards; a first hanger rod is vertically fixed to a lower surface of a slider of the first rail pair; a second hanger rod is vertically fixed to a lower surface of a slider of the second rail pair; the laser is fixed to a lower end of the first hanger rod, and an emitting end of the laser faces rightwards; the reflecting mirror is fixed to a lower end of the second hanger rod, and a mirror surface of the reflecting mirror is inclined leftwards; an incident end of the reflecting mirror directly faces the emitting end of the laser; the single photon detector is fixedly embedded in the assembly hole, and the single photon detector is lower than the inner bottom wall of the box-shaped housing; an incident end of the single photon detector faces upwards and directly faces an emitting end of the reflecting mirror; the power supply is located outside the box-shaped housing, and an output end of the power supply passes through the threading hole and is connected to a power supply end of the laser; and the PC computer is located outside the box-shaped housing, and an input end of the PC computer is connected to an output end of the single photon detector;

the method comprising following steps:

putting step, configured for putting a stack of test papers to be counted horizontally into the box-shaped housing through the rectangular operating hole, such that a left edge of the stack of test papers is located between the incident end of the single photon detector and the emitting end of the reflecting mirror;

starting step, configured for starting the laser, wherein a beam emitted by the laser is incident upon the left edge of the stack of test papers via the reflecting mirror, partial photons in the beam is absorbed by the stack of test papers, the remaining photons pass through the stack of test papers and are incident upon the single photon detector, and the single photon detector detects a number N of the remaining photons, and sends a detection result to the PC computer;

calculating step, configured for calculating by the PC computer, an luminous intensity I of the beam after passing through the stack of test papers according to the number N of the remaining photons first, then calculating a thickness d of the stack of test papers according to the luminous intensity I of the beam after passing through the stack of test papers, and then calculating a number m of the test papers according to the thickness d of the stack of test papers, thereby completing the counting of the stack of test papers, wherein specific calculation expressions are as follows:

$$I = Nh\nu \tag{1}$$

$$I = I_0 e^{-\alpha_a(\lambda)d} \tag{2}$$

$$m = d/d_0 \tag{3}$$

wherein h denotes a Planck constant; $\nu$ denotes an output frequency of the laser; $I_0$ denotes an output luminous intensity of the laser; $\alpha_a(\lambda)$ denotes an absorption coefficient of a single test paper; $d_0$ denotes a thickness of a single test paper; and h, $\nu$, $I_0$, $\alpha_a(\lambda)$, and $d_0$ are all known parameters.

8. The portable test paper counting method based on a single photon detector according to claim 7, wherein in step 3, $\nu$ and $I_0$ are both preset known parameters; and $\alpha_a(\lambda)$ and $d_0$ are both pre-determined known parameters.

* * * * *